US008239514B2

(12) United States Patent
Richardson et al.

(10) Patent No.: US 8,239,514 B2
(45) Date of Patent: *Aug. 7, 2012

(54) MANAGING CONTENT DELIVERY NETWORK SERVICE PROVIDERS

(75) Inventors: David R. Richardson, Seattle, WA (US); Bradley E. Marshall, Bainbridge Island, WA (US); Swaminathan Sivasubramanian, Seattle, WA (US); Tal Saraf, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,169

(22) Filed: Nov. 17, 2011

(65) Prior Publication Data

US 2012/0072600 A1    Mar. 22, 2012

Related U.S. Application Data

(63) Continuation of application No. 12/272,699, filed on Nov. 17, 2008, now Pat. No. 8,073,940.

(51) Int. Cl.
G06F 15/173 (2006.01)
(52) U.S. Cl. ......... 709/223; 709/200; 709/226; 725/145
(58) Field of Classification Search ............... 709/220, 709/223, 226, 228; 725/145
See application file for complete search history.

(56) References Cited

U.S. PATENT DOCUMENTS

| 5,341,477 | A | 8/1994 | Pitkin et al. |
|---|---|---|---|
| 5,611,049 | A | 3/1997 | Pitts |
| 5,774,660 | A | 6/1998 | Brendel et al. |
| 5,892,914 | A | 4/1999 | Pitts |
| 6,016,512 | A | 1/2000 | Huitema |
| 6,026,452 | A | 2/2000 | Pitts |
| 6,052,718 | A | 4/2000 | Gifford |
| 6,085,234 | A | 7/2000 | Pitts et al. |
| 6,098,096 | A | 8/2000 | Tsirigotis et al. |
| 6,108,703 | A | 8/2000 | Leighton et al. |
| 6,182,111 | B1 | 1/2001 | Inohara et al. |
| 6,205,475 | B1 | 3/2001 | Pitts |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |

(Continued)

OTHER PUBLICATIONS

Baglioni et al., "Preprocessing and Mining Web Log Data for Web Personalization", LNAI 2829, 2003, pp. 237-249.

(Continued)

*Primary Examiner* — Ario Etienne
*Assistant Examiner* — El Hadji Sall
(74) *Attorney, Agent, or Firm* — Knobbe, Martens, Olson & Bear, LLP

(57) ABSTRACT

A system, method, and computer readable medium for managing CDN service providers are provided. A network storage provider storing one or more resources on behalf of a content provider obtains client computing device requests for content. The network storage provider processes the client computing device requests and determines whether a subsequent request for the resource should be directed to a CDN service provider as a function of the updated or processed by the network storage provider storage component.

23 Claims, 9 Drawing Sheets

U.S. PATENT DOCUMENTS

| | | |
|---|---|---|
| 6,374,290 B1 | 4/2002 | Scharber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,654,807 B2 | 11/2003 | Farber et al. |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 * | 3/2006 | Lewin et al. ................ 709/217 |
| 7,010,598 B2 | 3/2006 | Sitaraman et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,233,978 B2 | 6/2007 | Overton et al. |
| 7,240,100 B1 | 7/2007 | Wein et al. |
| 7,260,598 B1 | 8/2007 | Liskov et al. |
| 7,269,784 B1 | 9/2007 | Kasriel et al. |
| 7,310,686 B2 | 12/2007 | Uysal |
| 7,320,131 B1 | 1/2008 | O'Toole, Jr. |
| 7,321,918 B2 | 1/2008 | Burd et al. |
| 7,363,291 B1 | 4/2008 | Page |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,573,916 B1 | 8/2009 | Bechtolsheim et al. |
| 7,624,169 B2 | 11/2009 | Lisiecki et al. |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,912,921 B2 | 3/2011 | O'Rourke et al. |
| 7,925,782 B2 | 4/2011 | Sivasubramanian et al. |
| 7,962,597 B2 | 6/2011 | Richardson et al. |
| 7,966,404 B2 | 6/2011 | Hedin et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,082,348 B1 | 12/2011 | Averbuj et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0078233 A1 | 6/2002 | Biliris et al. |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0101836 A1 | 8/2002 | Dorenbosch |
| 2002/0129123 A1 | 9/2002 | Johnson et al. |
| 2002/0138286 A1 | 9/2002 | Engstrom |
| 2002/0147770 A1 | 10/2002 | Tang |
| 2002/0156911 A1 | 10/2002 | Croman et al. |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0101278 A1 | 5/2003 | Garcia-Luna-Aceves et al. |
| 2003/0133554 A1 | 7/2003 | Nykanen et al. |
| 2003/0135509 A1 | 7/2003 | Davis et al. |
| 2003/0140087 A1 * | 7/2003 | Lincoln et al. ................ 709/201 |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0236700 A1 | 12/2003 | Arning et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0044791 A1 | 3/2004 | Pouzzner |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0172466 A1 | 9/2004 | Douglas et al. |
| 2004/0203630 A1 | 10/2004 | Wang |
| 2004/0205149 A1 | 10/2004 | Dillon et al. |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0132083 A1 | 6/2005 | Raciborski et al. |
| 2005/0188073 A1 | 8/2005 | Nakamichi et al. |
| 2005/0192008 A1 | 9/2005 | Desai et al. |
| 2005/0232165 A1 | 10/2005 | Brawn et al. |

| | | |
|---|---|---|
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020596 A1 | 1/2006 | Liu et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0064500 A1 | 3/2006 | Roth et al. |
| 2006/0074750 A1 | 4/2006 | Clark et al. |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0014241 A1 | 1/2007 | Banerjee et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0174426 A1 | 7/2007 | Swildens et al. |
| 2007/0183342 A1 | 8/2007 | Wong et al. |
| 2007/0208737 A1 | 9/2007 | Li et al. |
| 2007/0244964 A1 | 10/2007 | Challenger et al. |
| 2007/0250467 A1 | 10/2007 | Mesnik et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2008/0005057 A1 | 1/2008 | Ozzie et al. |
| 2008/0008089 A1 | 1/2008 | Bornstein et al. |
| 2008/0046596 A1 | 2/2008 | Afergan et al. |
| 2008/0071987 A1 | 3/2008 | Karn et al. |
| 2008/0072264 A1 | 3/2008 | Crayford |
| 2008/0086574 A1 | 4/2008 | Raciborski et al. |
| 2008/0103805 A1 | 5/2008 | Shear et al. |
| 2008/0114829 A1 | 5/2008 | Button et al. |
| 2008/0134043 A1 | 6/2008 | Georgis et al. |
| 2008/0147866 A1* | 6/2008 | Stolorz et al. ................. 709/226 |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0204682 A1 | 8/2009 | Jeyaseelan et al. |
| 2009/0210549 A1 | 8/2009 | Hudson et al. |
| 2009/0248786 A1* | 10/2009 | Richardson et al. .......... 709/201 |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson et al. .......... 709/239 |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327517 A1* | 12/2009 | Sivasubramanian et al. . 709/238 |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0122069 A1 | 5/2010 | Gonion |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0332595 A1 | 12/2010 | Fullagar et al. |
| 2011/0078000 A1 | 3/2011 | Ma et al. |
| 2011/0238501 A1 | 9/2011 | Almeida |
| 2011/0252142 A1 | 10/2011 | Richardson et al. |
| 2011/0258049 A1 | 10/2011 | Ramer et al. |

OTHER PUBLICATIONS

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

International Search Report and Written Opinion in PCT/US2011/053302 mailed Nov. 28, 2011 in 11 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

* cited by examiner

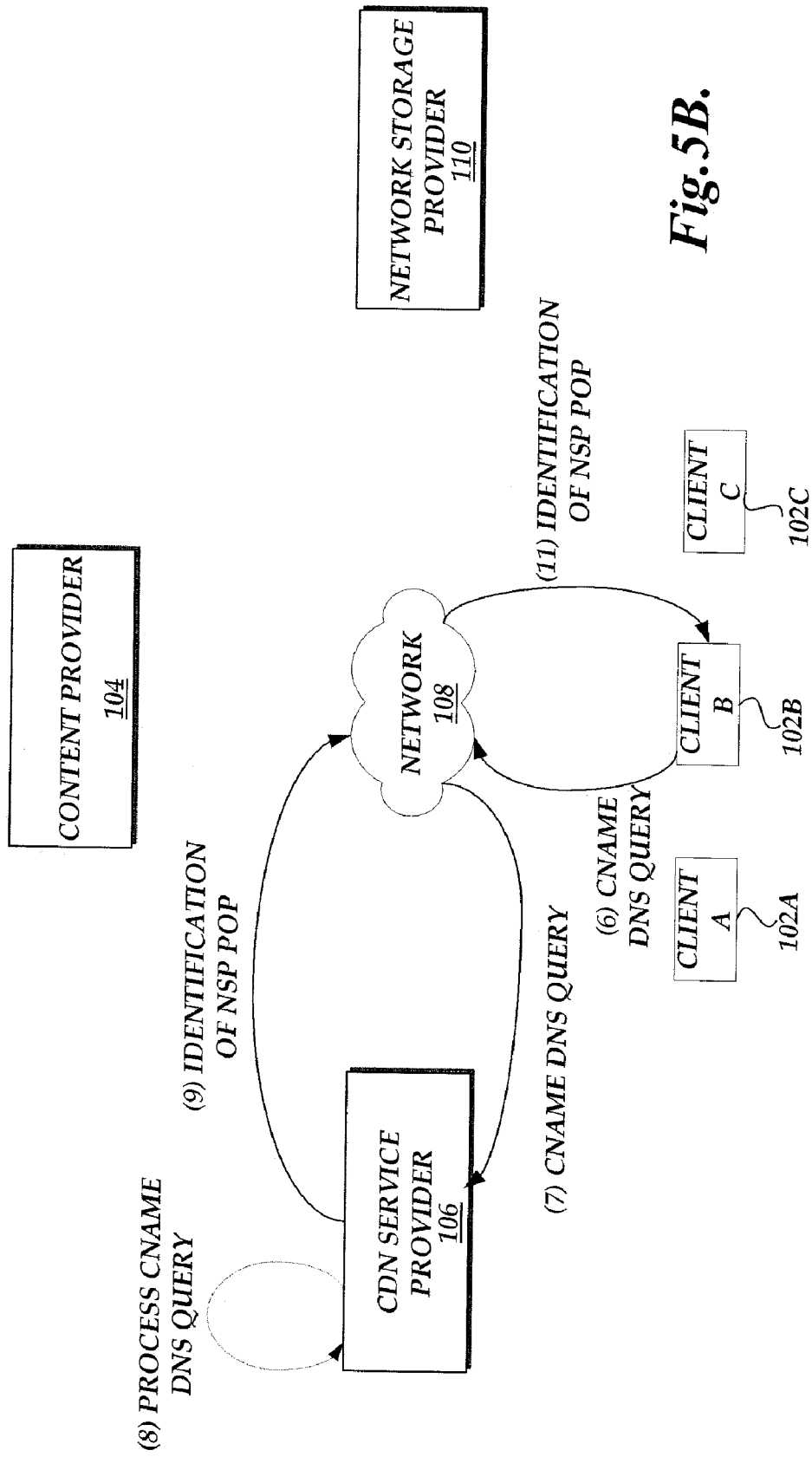

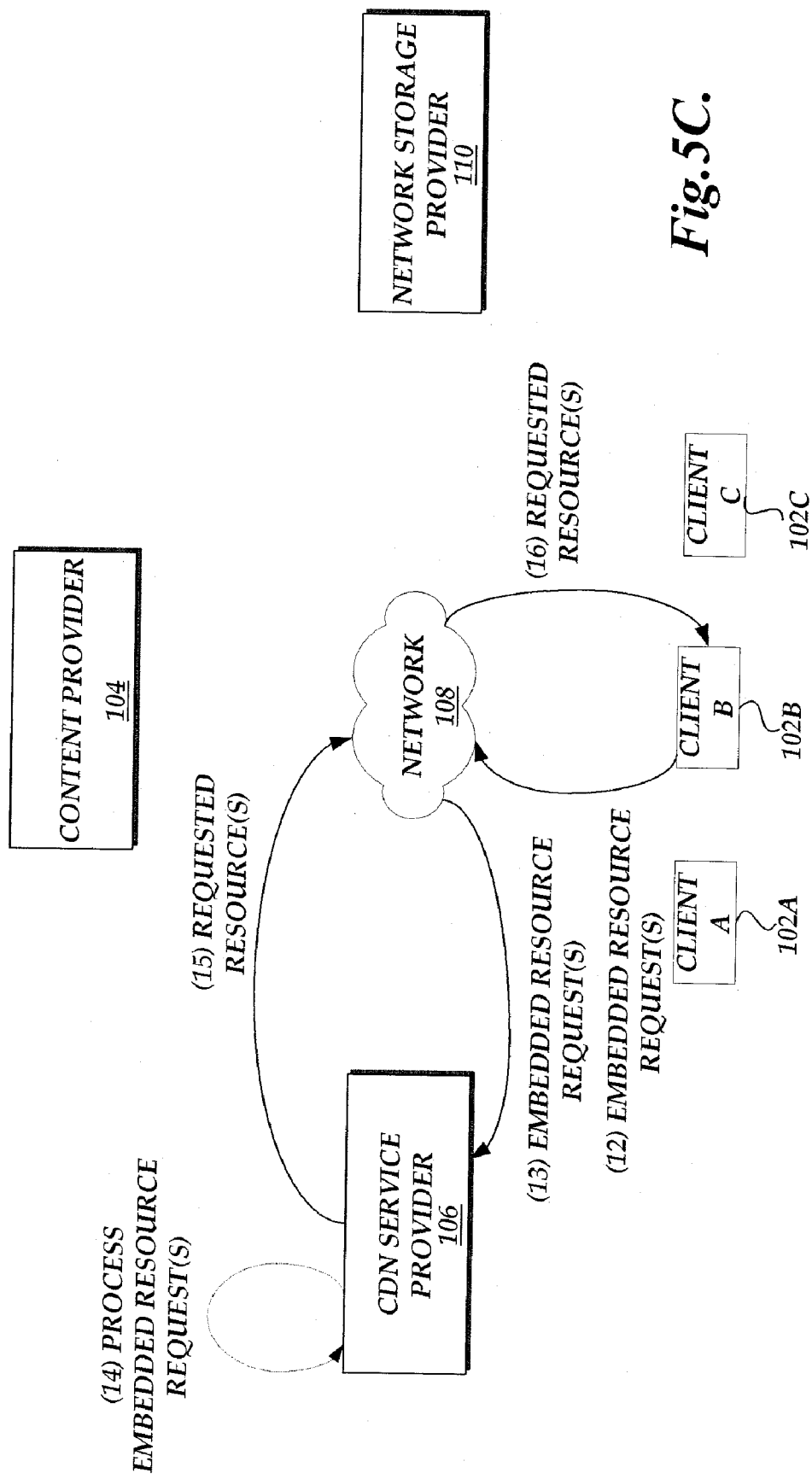

US 8,239,514 B2

MANAGING CONTENT DELIVERY NETWORK SERVICE PROVIDERS

CROSS REFERENCE TO RELATED APPLICATIONS

This application is a continuation of U.S. patent application No. 12/272,699, entitled "MANAGING CONTENT DELIVERY NETWORK SERVICE PROVIDERS" and filed on Nov. 17, 2008, the disclosure of which is incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A-5C are block diagrams of the content delivery environment of FIG. 1 illustrating various embodiments for obtaining client computing device DNS queries and having the subsequent resource request processed by a CDN service provider.

DETAILED DESCRIPTION

Generally described, the present disclosure is directed to delivery of one or more resources associated with a content provider by selecting from available storage service providers and content delivery network ("CDN") service providers. Specifically, aspects of the disclosure will be described with regard to the management of resource delivery by a network storage provider on behalf of a content provider as a function of request processing criteria. In one aspect, as a function of the request processing criteria, a network storage provider may identify a storage component associated with the network storage provider for processing a subsequent request by a client computing device. In another aspect, as a function of the request processing criteria, the network storage provider may select one or more CDN service providers for processing subsequent requests by a client computing device.

In an illustrative embodiment, the request processing criteria, or request processing information, can correspond to a financial cost attributed to the content provider for delivery of requested resources by the network storage provider or a CDN service provider. The request processing criteria can also correspond to quality of service characteristics associated with the delivery of requested resources by a network storage provider or CDN service provider including, but not limited to a volume of client computing device resource requests made to the network storage provider, available communication network bandwidth or communication network bandwidth utilization, measured or estimated latencies, error rates or counts, and the like. Still further, the request processing criteria can correspond to content provider or client computing device specified information, such as end user specified feedback. Although various aspects of the disclosure will be described with regard to illustrative examples and embodiments, one skilled in the art will appreciate that the disclosed embodiments and examples should not be construed as limiting.

Figure 1:
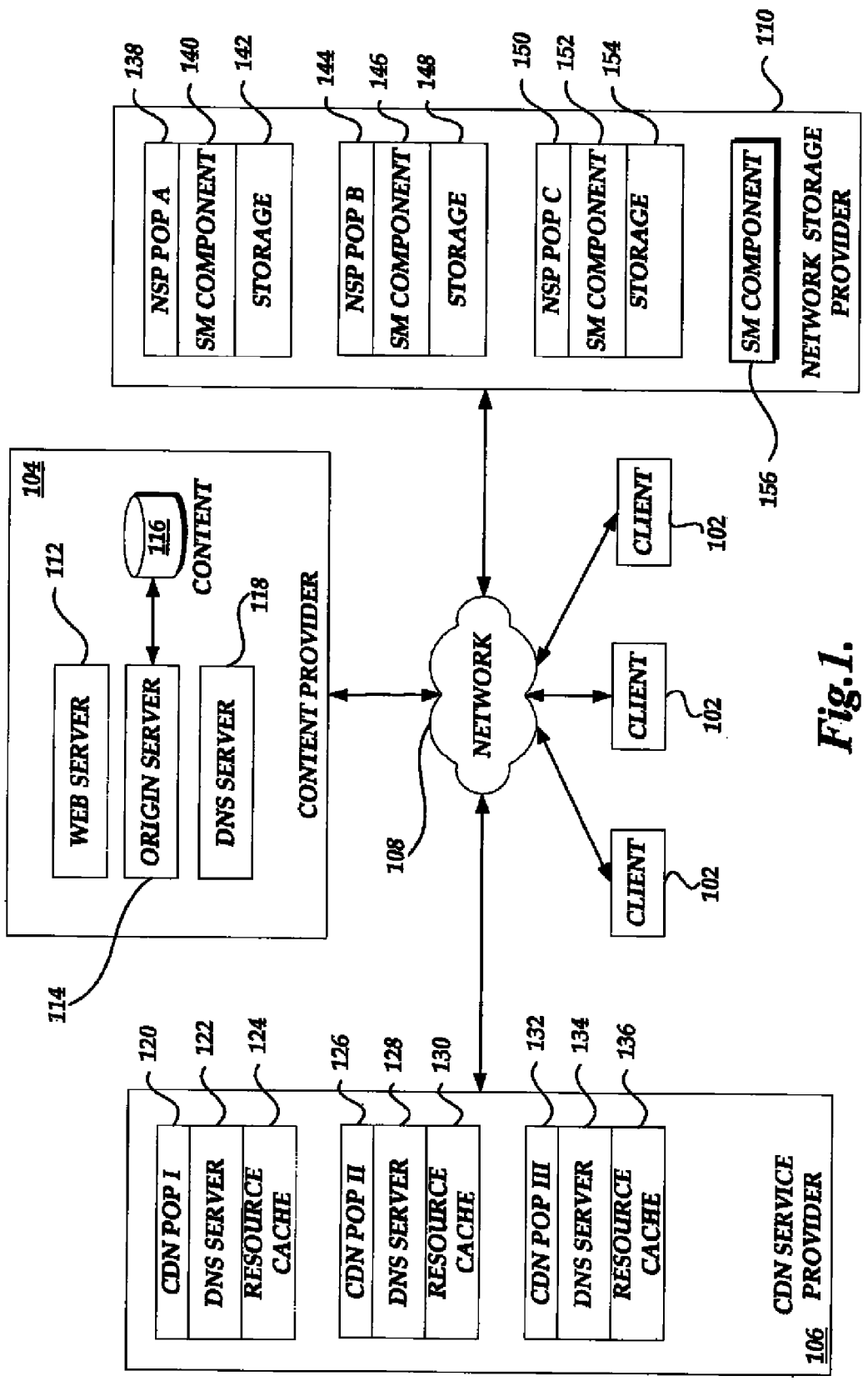
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address. Additionally, the content provider 104 may include multiple components or eliminate some components altogether, such as origin server 114.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS nameserver computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. Each NSP POP 138, 144, 150 can include a storage management ("SM") component 140, 146, 152 for obtaining requests for resources from the client computing devices 102 and determining whether the requested resource should be provided by a CDN service provider 106 or from a storage component associated with the network storage provider 110. In an illustrative embodiment, the storage management components 138, 144, 150 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate. Additionally, the network storage provider 110 may include a stand alone SM component 156 that provides CDN service provider recommendations to content providers 104, such as via a Web service.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, additional DNS nameservers, and the like. Even further, the components of the network storage provider 110 and components of the CDN service provider 106 can be managed by the same or different entities.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
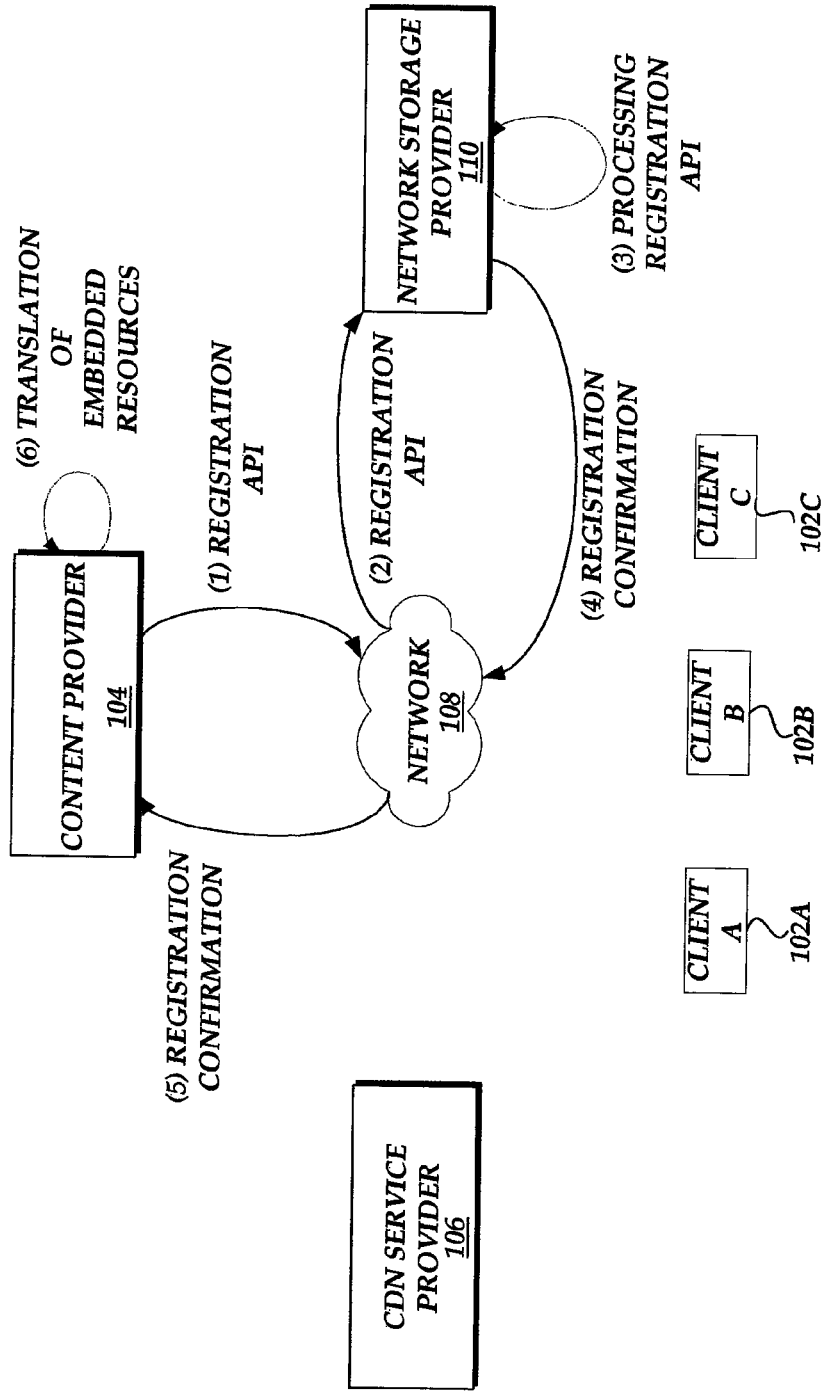
FIG. 2 is a block diagram of the content delivery environment of FIG. 1 illustrating the registration of a content provider with a network storage provider.

With reference to FIG. 2, an illustrative interaction for registration of a content provider 104 with the network storage provider 110 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS nameserver corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.storageprovider.com/path/
resource.xxx

Figure 3:
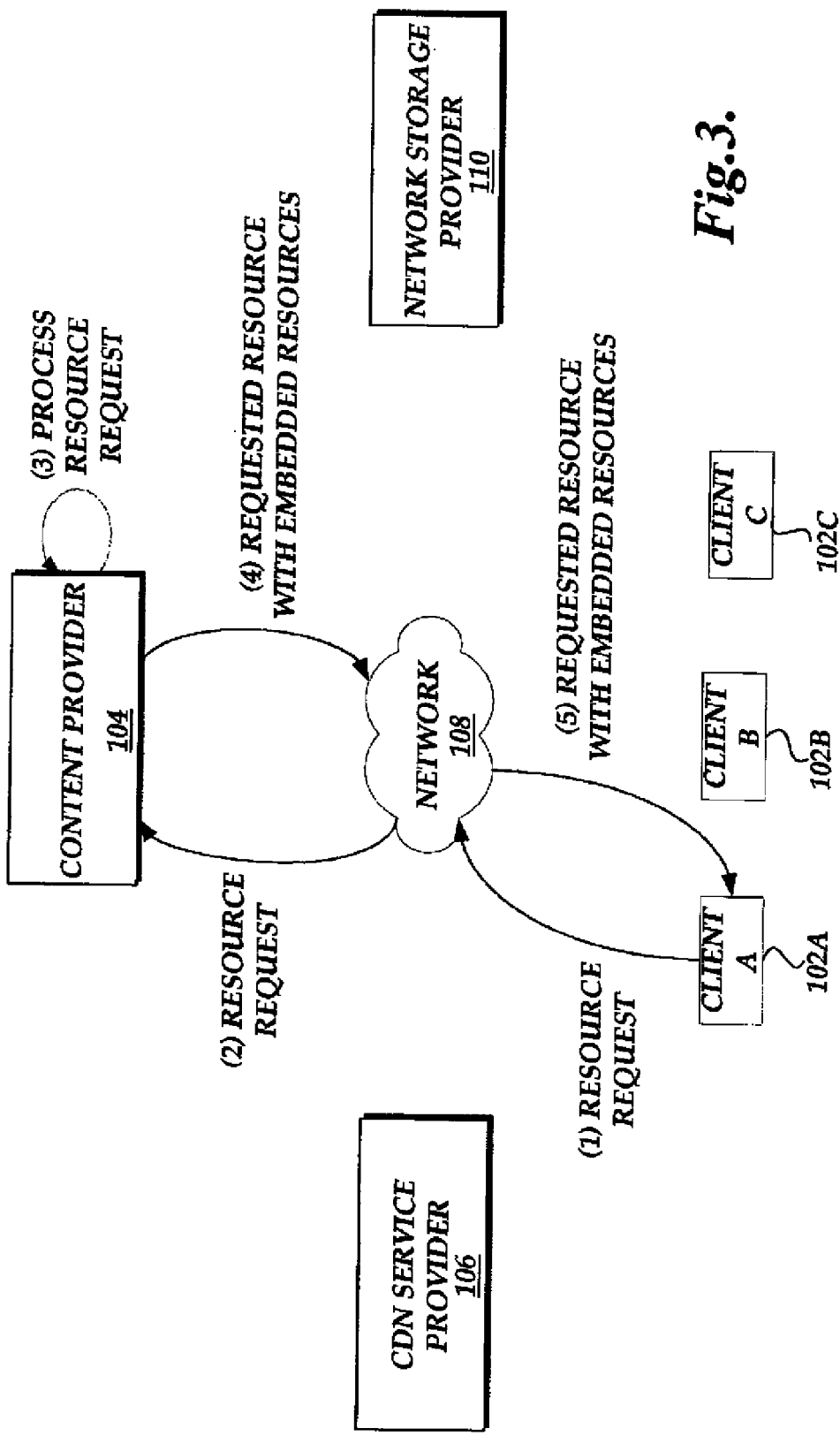
FIG. 3 is a block diagram of the content delivery environment of FIG. 1 illustrating the generation and processing of a resource request by a client computing device to a content provider.

In another embodiment, the information associated with the network storage provider 110 is included in the modified URL, such as through prepending or other techniques, such that the modified URL can maintain all of the information associated with the original URL. In this embodiment, the modified URL would have the form of:

http://additional information.storageprovidencom/www.
contentprovidencom/path/resource.xxx With reference now to FIG. 3, after completion of the registration and translation processes illustrated in FIG. 2, a first client computing device 102A subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102A via the processing of information, such as hypertext markup language ("HTML"), extensible markup language ("XML"), and the like. The requested content can also include a number of embedded resource identifiers, described above, that corresponds to resource objects that should be obtained by the client computing device 102A as part of the processing of the requested content. The embedded resource identifiers will generally in the form of the modified URLs, described above.

Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 110. Upon receipt of the returned CNAME, the client computing device 102A subsequently transmits a DNS query corresponding to the received CNAME. The client computing device 102A can then process the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Figure 4A:
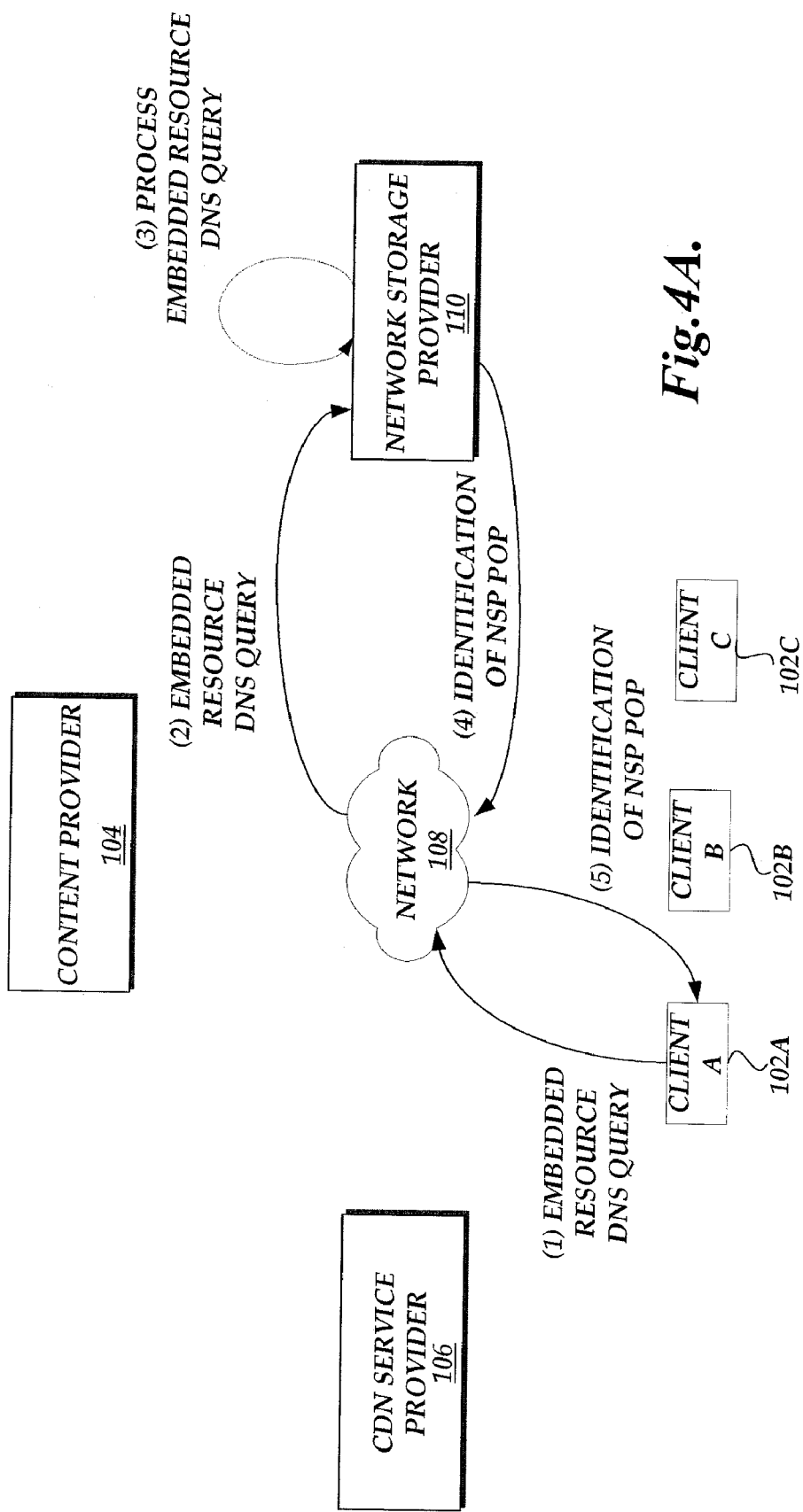
FIGS. 4A and 4B are block diagrams of the content delivery environment of FIG. 1 illustrating obtaining client computing device DNS queries and having the subsequent resource request processed by a network storage provider.

With reference now to FIG. 4A, upon receipt of the requested content, the client computing device 102A, such as through a browser software application, begins processing any of the markup code included in the content and attempts to acquire the resources identified by the embedded resource identifiers (e.g., the embedded, modified URLs). Accordingly, the first step in acquiring the content correspond to the issuance, by the client computing device 102 (through its local DNS resolver), a DNS query for the Original URL resource identifier that results in the identification of a DNS nameserver authoritative to the "." and the "corn" portions of the modified URL. After partially resolving the modified URL according to the "." and "corn" portions of the embedded URL, the client computing device 102A then issues another DNS query for the resource URL that results in ".storageprovider" portion of the embedded, modified URL. The issuance of DNS queries corresponding to the "." and the "com" portions of a URL, such as the modified URL, are well known and have not been illustrated.

In an illustrative embodiment, the identification of the identification of a DNS nameserver authoritative to the "storageprovider" corresponds to an IP address of a DNS nameserver associated with the network storage provider 110. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102A to a shared IP address will arrive at a DNS nameserver component of the network storage provider 110 logically having the shortest network topology distance, often referred to as network hops, from the client computing device. The network topology distance does not necessarily correspond to geographic distance. However, in some embodiments, the network topology distance can be inferred to be the shortest network distance between a client computing device 102A and a network storage provider POP. With continued reference to FIG. 4A, once one of the DNS nameservers in the network storage provider 110 receives the request, the specific DNS nameserver attempts to resolve the request.

As will be explained in detail below, to resolve the DNS query, the SM components 140, 146, 152, 156 (such as via the DNS nameserver component associated with the SM components) of the network storage provider 110 can maintain request processing criteria regarding the processing of requests for each resource, or a subset of resources, provided by the content provider 104. In an illustrative embodiment, the SM components 140, 146, 152, 156 utilizes the request processing criteria to determine whether a subsequent request for the resource should be processed by a storage component of the network storage provider 110 or whether the subsequent request for the resource should be processed by a CDN service provider 106. The request processing criteria can include the total number of requests obtained by the network storage provider 110 for a resource over a defined period of time, trends regarding an increase/decrease in requests for the resource, a current financial cost associated with the delivery of the resource by the network storage provider, quality of service metrics measured by the network storage provider 110 or CDN service provider 106, additional criteria provided by the content provider 104, and various combinations or alternatives thereof An alternative in which the SM components 140, 146, 152, 156 select a CDN service provider 106 will be described with regard to FIGS. 5A-5C.

With continued reference to FIG. 4A, based on the request processing criteria maintained by the SM components 140, 146, 152, 156 (either individually maintained or shared), in some embodiments, the network storage provider 110 can utilize processing criteria to select that a storage component associated with the network storage provider 110 should process the subsequent request for the resource by the client computing devices 102A. In an illustrative embodiment, the receiving DNS nameserver can resolve the DNS query by identifying an IP address of a network storage provider storage component 142, 148, 154 (FIG. 1) that will process the request for the requested resource. The DNS nameserver of the SM components 140, 146, 152, 156 can utilize at least a portion of request processing criteria to the specific IP address of a network storage provider storage component 142, 148, 154 (FIG. 1). Additionally, the SM components 140, 146, 152, 156 can further utilize additional request processing criteria associated only with the selection of the network storage provider storage component 142, 148, 154 and not utilized to select between the network storage provider 110 or the CDN service provider 106. Still further, the SM components 140, 146, 152, 156 can utilize additional request routing methodologies such as current communication network conditions, often referred to as "Internet weather," or other selection methodologies, such as round-robin selection or prioritized lists.

Figure 4B:
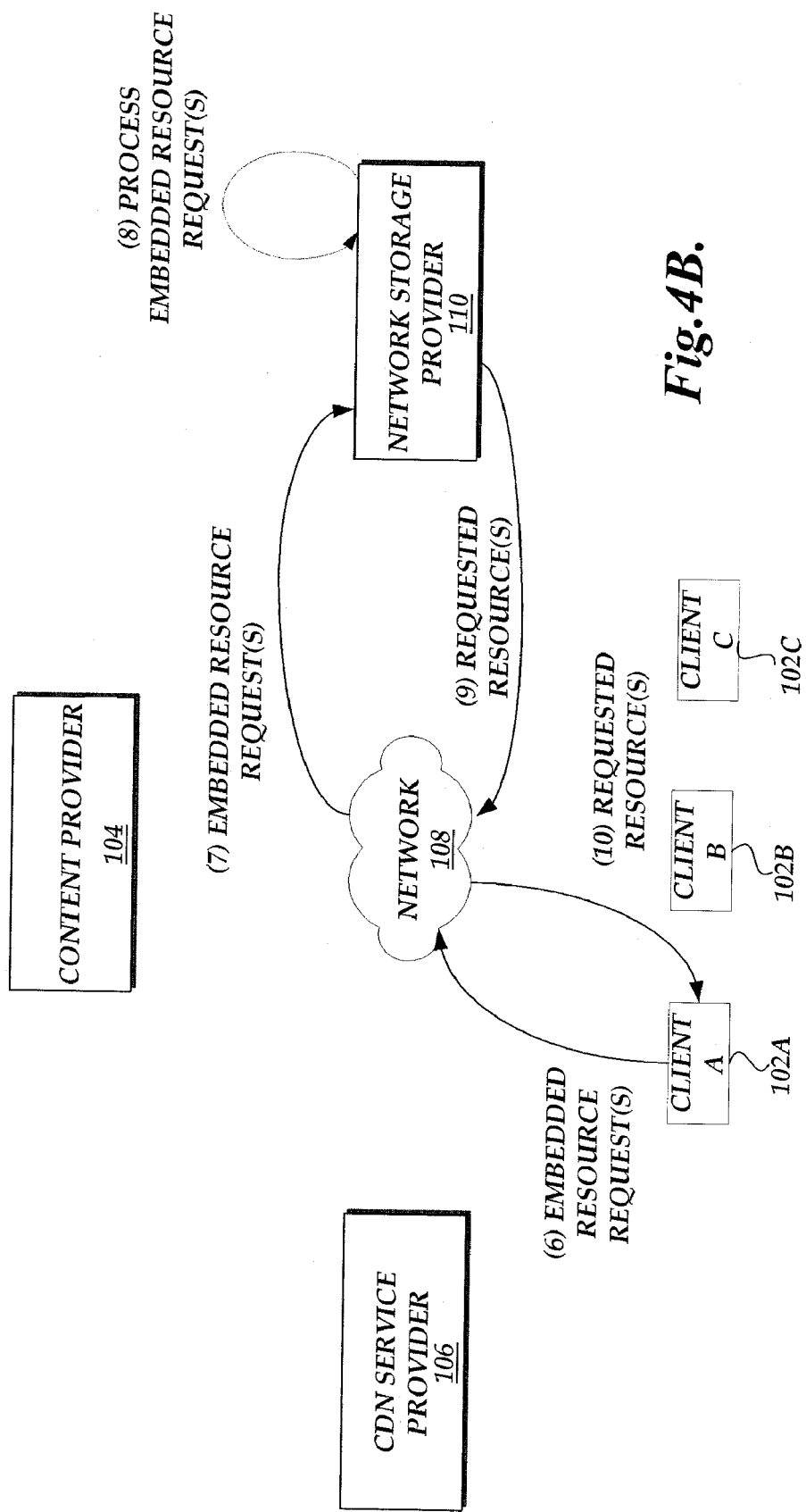

With reference now to FIG. 4B, upon receipt of the successful resolution of the DNS query to the storage provider component (e.g., a DNS query corresponding to the modified URL http://additional information.storageprovider.com/path/resource.xxx), the client computing device 102A transmits embedded resource requests to the network storage provider storage component 142, 148, 154 (FIG. 1) corresponding to the previously provided IP address. In turn, the receiving network storage provider storage component can process the request by providing the requested content obtained from the origin server 114 of the content provider 104. The requested content can be transmitted to the requesting client computing device 102A via the communication network 108.

Figure 5A:
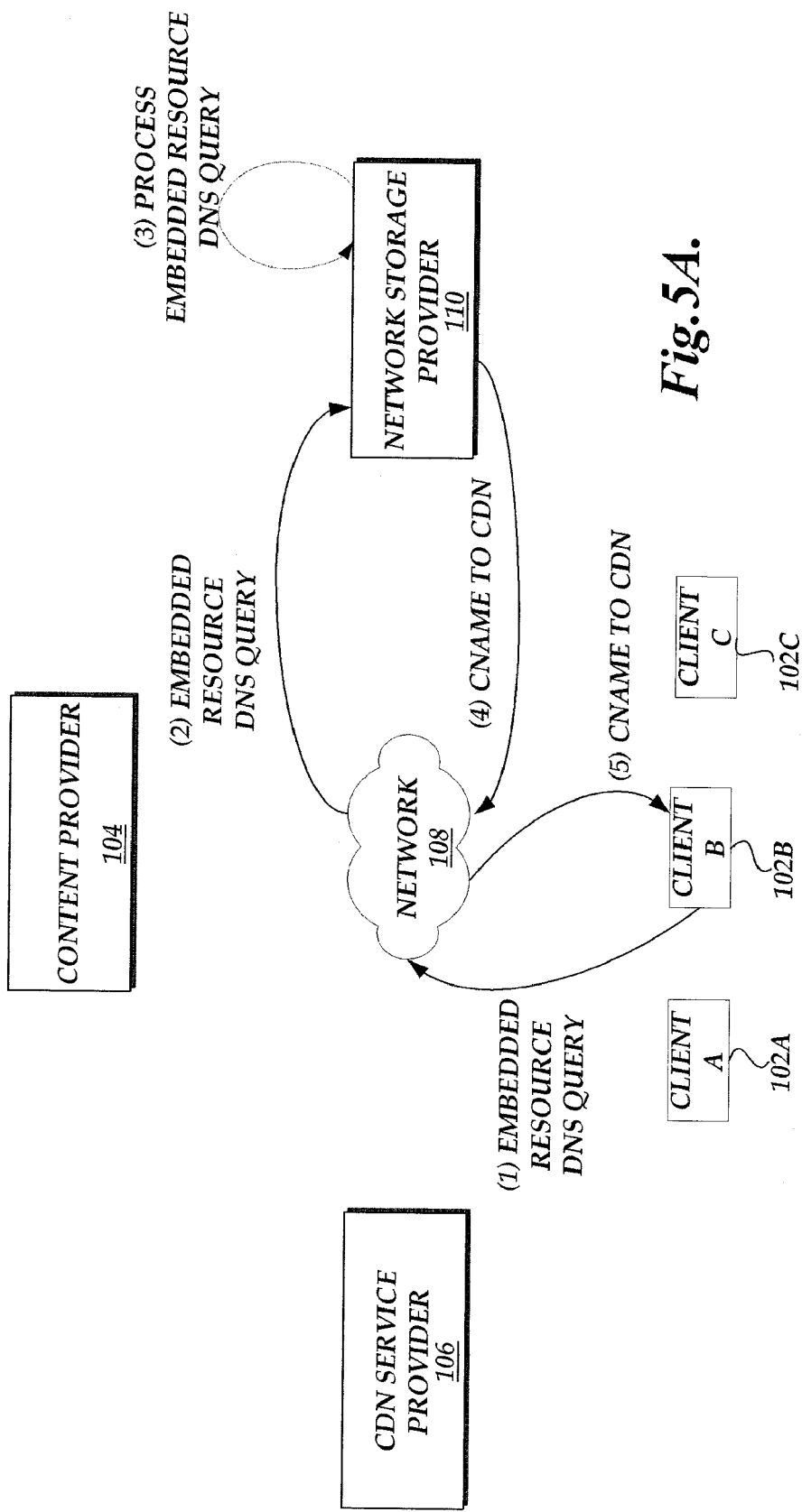

With reference now to FIGS. 5A-5C, assume that the content provider has authorized (directly or indirectly) the utilization of a CDN service provider 106. In one embodiment, the content provider 104 can authorize the implementation of a CDN server provider 106 in accordance with APIs or graphical user interfaces that facilitate the authorization and initialization of one or more CDN service providers 106. Additionally, the content provider 104 can implement logic, or programmatic instructions, that facilitate the authorization and initialization of one or more CDN service providers 106 without requiring human interaction. Subsequent to the authorization of the utilization of the CDN service provider 106, a client computing device, illustratively client computing device 102B, repeats the request for a resource and is returned the requested resource with a number of embedded resource (similar to the interaction illustrated in FIG. 3).

With reference to FIG. 5A, to obtain the requested resources, the client computing device 102B transmits a DNS query for an embedded resource (e.g., (e.g., http://additional information.storageprovider.com/path/resource.xxx), which is received by a DNS nameserver at the network storage provider 110, such as the DNS nameserver component associated with one of the SM components 140, 144, 150, 156. As described above with regard to FIG. 4A, the receiving DNS nameserver attempts to resolve the client computing device DNS query. As also described above, to resolve the DNS query, the SM components 140, 146, 152, 156 (such as via the DNS nameserver component associated with the SM components) of the network storage provider 110 can maintain request processing criteria regarding the processing of requests for each resource, or a subset of resources, provided by the content provider 104. In an illustrative embodiment, the SM components 140, 146, 152, 156 utilizes the request processing criteria to determine whether a subsequent request for the resource should be processed by a storage component of the network storage provider 110 or whether the subsequent request for the resource should be processed by a CDN service provider 106.

With continued reference to FIG. 5A, based on the request processing criteria maintained by the SM components 140, 146, 152, 156 (either individually maintained or shared), in some embodiments, the network storage provider 110 can utilize processing criteria to select that a resource cache component associated with the CDN service provider 106 should process the subsequent request for the resource by the client computing devices 102B (as opposed to a network storage component of the network storage provider 110). Accordingly, instead of resolving the DNS query by providing an IP address associated with a storage provider storage component 142, 148, 154, the network storage provider 110 can maintain sets of various alternative resource identifiers corresponding to one or more CDN service providers 106. The alternative resource identifiers can be provided by the network storage provider 110 to the client computing device 102B such that a subsequent DNS query on the alternative resource identifier will partially resolve to a DNS nameserver component within the CDN service provider's network. The network storage provider 110 may select (or otherwise obtain) an alternative resource identifier that is intended to resolve to an appropriate DNS nameserver of the CDN service provider 106 based on a variety of criteria. For example, the network storage provider may select an alterative resource identifier based on a regional service plan or service level information obtained from the content provider. As will be described further below, this additional information may also be used for further request routing.

In an illustrative embodiment, the alternative resource identifiers are in the form of one or more CNAME records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

http://additional information.storageprovider.com/path/resource.xxx CNAME request_routing_information.cdnprovider.com In accordance with this illustrative embodiment, the network storage provider 110 maintains a data store that defines CNAME records for various URLs corresponding to embedded resources stored by the network storage provider 110. If a DNS query corresponding to a particular URL matches an entry in the data store, the network storage provider 110 returns a CNAME record to the client computing device 102B that will direct the client computing device to a CDN service provider 106.

The returned CNAME can also include request routing information that is different from or in addition to the information provided in URL of the current DNS query. For example, if the CNAME selection is based on a regional service plan or a service level plan selected by the content provider 104, a specific identifier can be included in the "request_routing_information" portion of the specific CNAME record. In another embodiment, request routing information can be found in the identification of a CDN service provider 106 domain different from the domain found in the original URL. For example, if the CNAME is based on a regional plan, a specific regional plan domain (e.g., "cdn-provder-region1.com") could be used in the domain name portion of the specific CNAME record. Any additional request routing information can be prepended to the existing request routing information in the original URL such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is identified by the network storage provider 110.

With reference now to FIG. 5B, once the client computing device 102B obtains the returned CNAME, the client computing device generates a subsequent DNS query corresponding to the CNAME. As previously discussed with regard to FIG. 4A, the DNS query process could first start with DNS queries for the "." and "com" portions, followed by a query for the "cdnprovider" portion of the CNAME. To the extent, however, that the results of a previous DNS queries can be cached (and remain valid), the client computing device 102B can utilize the cached information and does not need to repeat the entire process. Similar to the process described with regard to FIGS. 4A and 5A, the client computing device 102B issues a DNS query for the resource URL that results in ".cdnprovider" portion of the CNAME.

In an illustrative embodiment, the identification of the identification of a DNS nameserver authoritative to the "cdnprovider" corresponds to an IP address of a DNS nameserver associated with the CDN server provider, such as DNS nameserver components 122, 128, 134 (FIG. 1). In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102B to a shared IP address will arrive at a DNS nameserver component 122, 128, 134 (FIG. 1) of the CDN service provider 106 logically having the shortest network topology distance, often referred to as network hops, from the client computing device. As previously discussed, the network topology distance does not necessarily correspond to geographic distance. However, in some embodiments, the network topology distance can be inferred to be the shortest network distance between a client computing device 102B and a network storage provider POP 120, 126, 132 (FIG. 1).

In an illustrative embodiment, the DNS nameserver components, illustratively DNS nameserver component 128, can utilize a variety of information in selecting a resource cache component. In one example, the DNS nameserver component 128 can default to a selection of a resource cache component of the same POP. In another example, the DNS nameserver components can select a resource cache component based on various load balancing or load sharing algorithms. Still further, the DNS nameserver components can utilize network performance metrics or measurements to assign specific resource cache components. The IP address selected by a DNS nameserver component may correspond to a specific caching server in the resource cache. Alternatively, the IP address can correspond to a hardware/software selection component (such as a load balancer).

With reference now to FIG. 5C, in an illustrative example, assume that the CDN service provider 106 has selected the resource cache component 130 of POP 126 (FIG. 1). Upon receipt of the IP address for the resource cache component 130, the client computing device 102B transmits requests for the requested content to the resource cache component 130. The resource cache component 130 processes the request in a manner described above and the requested content is transmitted to the client computing device 102B.

As previously described, the network storage provider 110 maintains the table of alternative resource identifiers (e.g. CNAMES) that are used to direct a client computing device 102 to a CDN service provider 106. In an illustrative embodiment, the network storage provider 110 can manage the list of alternative resource identifiers such that the content provider 104 can utilize a different CDN service provider 106. For example, the network storage provider 110 can continuously calculate a cost associated with processing requests for specific resources and make updated recommendations regarding the utilization of a CDN service provider 106 or the utilization of a different CDN service provider.

Figure 6:
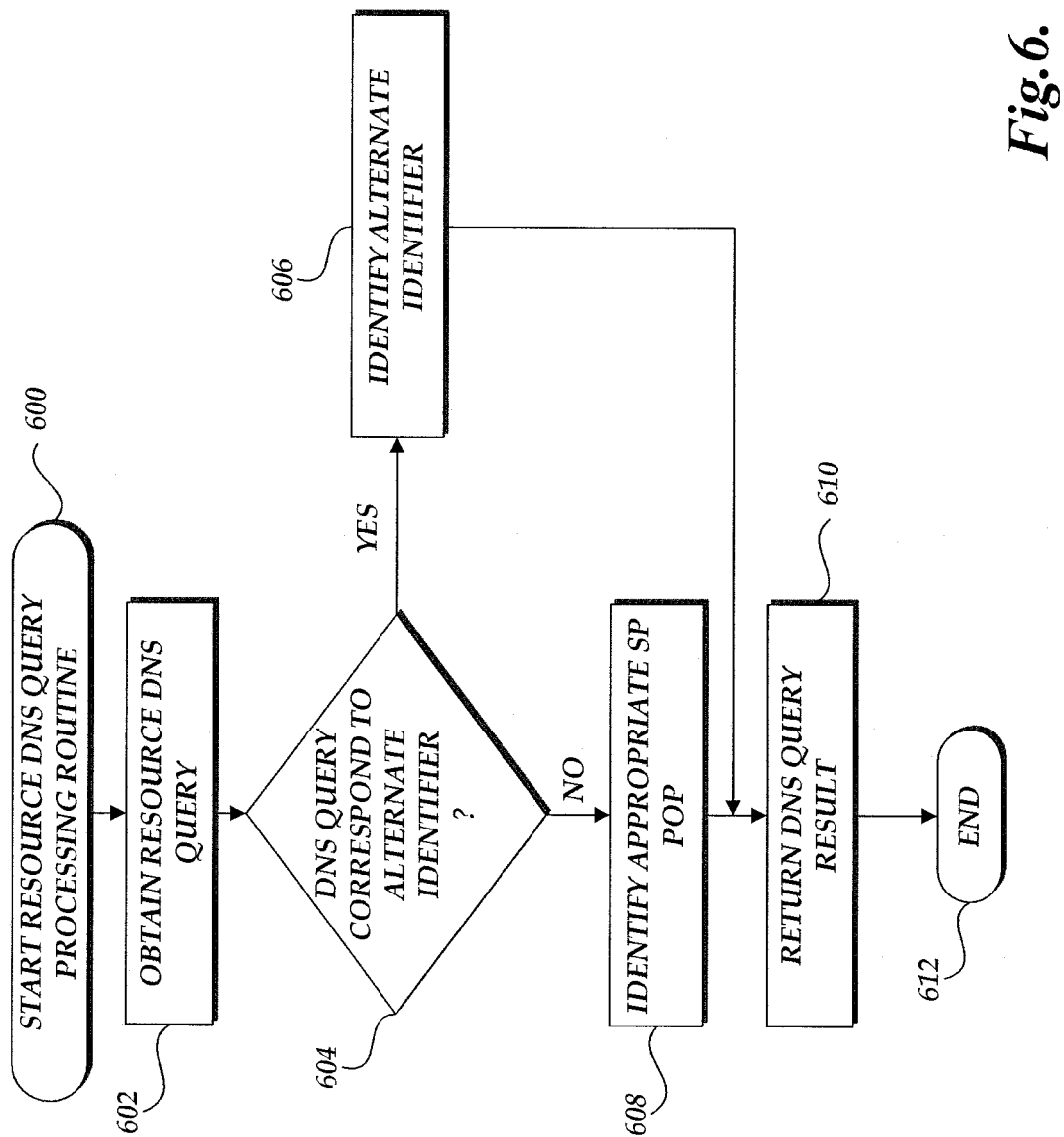
FIG. 6 is a flow diagram illustrative of a resource DNS query processing routine implemented by a network storage provider.

With reference now to FIG. 6, a flow diagram illustrative of a resource DNS query processing routine 600 implemented by a network storage provider 110 will be described. One skilled in the relevant art will appreciate that actions/steps outlined for routine 600 may be implemented by one or many computing devices/components that are associated with the network storage provider 110. Accordingly, routine 600 has been logically associated as being performed by the network storage provider 110.

At block 602, one of the DNS nameservers at one of the SM components 140, 146, 152, 156 (or corresponding to the network storage provider 110) receives a DNS query corresponding to resource identifier. As previously discussed, the resource identifier can be a URL that has been embedded in content requested by the client computing device 102 and previously provided by the content provider 104. At decision block 604, a test is conducted to determine whether the receiving DNS nameserver is authoritative to resolve the DNS query. In an illustrative embodiment, the receiving DNS nameserver can determine whether it is authoritative to resolve the DNS query if there are no CNAME records corresponding to the received resource identifier. As previously discussed, for purposes of the routine 600, a DNS nameserver component is considered to be authoritative to a DNS query if the DNS nameserver can resolve the query by providing a responsive IP address associated with network storage provider storage component 142, 148, 154 (FIG. 1). In this context, the DNS nameserver may be operative to receive DNS queries on behalf network storage provider 110, but not authoritative if the DNS query cannot be completely resolved by providing a responsive IP address.

As previously described, to determine whether the DNS query can be resolved to an IP address of the network storage provider storage component 142, 148, 154 (FIG. 1) or whether an alternate resource identifier should be provided, the receiving DNS nameserver utilizes request processing criteria to make such a determination. In an illustrative embodiment, the receiving DNS nameserver will utilize the cost information, at least in part, to make such a determination. The cost information corresponds to a financial cost attributable to the content provider 104 for the delivery of resources by the network storage provider 110 and the CDN service provider 106. The financial cost may be defined in a variety of ways and can be obtained by the SM components 140, 146, 152, 156 in a variety of ways.

In one example, the cost information may designate that the content provider 104 has requested that the SM components 140, 146, 152, 156 select the service provider (generally referred to as either the network storage provider 110 or a CDN service provider 106) associated with the lowest current financial cost to provide the requested resource. Accordingly, the SM components 140, 146, 152, 156 could obtain cost information for at least a portion of the POPs and select the server provider (e.g., the network storage provider 110 or the CDN service provider 106) associated with the lowest financial cost. The financial cost information utilized to select the lowest financial costs may be based on a current financial costs or projected financial costs. The projected financial costs can be based on criteria, such as time of day, characteristics of the resource (e.g., size of the data, type of data, etc.), anticipated data throughput volumes, current loads experienced by each service provider, and the like. For example, if a service provider's POP resources are at an optimal capacity, the service provider may project financial cost at a premium cost level (e.g., a highest cost level) because any additional data traffic would cause the resources to operate above optimal rates. Conversely, the service provider may project lower financial costs for specific POPs according to historically known low volume times (e.g., time of day, days of the month, time of the year, special days/holidays, etc.). The financial cost information may be a single cost projected for each identifiable service provider. Alternatively, the financial cost information may be a set of costs associated with one or more identifiable components of each service provider (e.g., financial information for one or more POPs associated with a service provider).

In another example, the cost information may designate the content provider 104 has requested that the cost associated with the providing the requested resource be maintained below one or more cost thresholds or cost tiers. Accordingly, the SM components 140, 146, 152, 156 could obtain financial cost information for the available service providers and select only those service providers with a financial cost at or below the cost thresholds. The SM components 140, 146, 152, 156 could then utilize other request processing criteria to select from the selected DNS nameserver (if more than one DNS nameserver is identified) or selected in accordance with other selections methodologies (e.g., random, round robin, etc.).

In another embodiment, the SM components 140, 146, 152, 156 can a determined/projected volume of request information for selecting a service provider. The determined/projected volume of request information can include the total number of requests obtained by the network storage provider 110 for a resource over a defined period of time, trends regarding an increase/decrease in requests for the resource, and various combinations or alternatives thereof.

In a further embodiment, the SM components 140, 146, 152, 156 can utilize geographic criteria for selecting a service provider. The geographic criteria can correspond to geographic-based regional service plans available between the service providers and the content provider 104. Accordingly, a client computing device 102 DNS query received in a region not corresponding to the content provider's regional plan may be better processed by a DNS nameserver in region corresponding to the content provider's regional plan. In this example, the SM components 140, 146, 152, 156 also obtain geographic information from the client directly (such as information provided by the client computing device or ISP) or indirectly (such as inferred through a client computing device's IP address).

In yet another embodiment, the SM components 140, 146, 152, 156 can utilize service level criteria for selecting a service provider. The service level criteria can correspond to service or performance metrics contracted between the available service providers and the content provider 104. Examples of performance metrics can include latencies of data transmission between the service provider POPs and the client computing devices 102, total data provided on behalf of the content provider 104 by the service provider POPs, error rates for data transmissions, and the like.

In still a further embodiment, the SM components 140, 146, 152, 156 can utilize network performance criteria for selecting a service provider. The network performance criteria can correspond to measurements of network performance for transmitting data from the service provider POPs to the client computing device 102. Examples of network performance metrics can include network data transfer latencies (measured by the client computing device or the service providers, network data error rates, and the like.

In another embodiment, the SM components 140, 146, 152, 156 can utilize content provider specified criteria for selecting a service provider. The content provider specified criteria can correspond to a variety of measurements or metrics specified by the content provider 104 and related to the delivery of resources on behalf of the content provider. The measurements or metrics can include content provider specified quality metrics (e.g., error rates), user complaints or error reports, and the like.

In accordance with an illustrative embodiment, the DNS nameserver maintains a data store that defines CNAME records for various URLs. If a DNS query corresponding to a particular URL matches an entry in the data store, the SM components 140, 146, 152, 156 returns a CNAME record as defined in the data store. In an illustrative embodiment, the data store can include multiple CNAME records corresponding to a particular original URL. The multiple CNAME records would define a set of potential candidates that can be returned to the client computing device. In an illustrative embodiment, each the SM component 140, 146, 152, 156 maintains the same data stores that define CNAME records, which can be managed centrally by the network storage provider 110. Alternatively, each SM component 140, 146, 152, 156 can maintain specific data stores that define CNAME records, which can be managed centrally by the network storage provider 110 or locally at the SM component 140, 146, 152, 156.

The returned CNAME can also include request routing information that is different from or in addition to the information provided in URL/CNAME of the current DNS query. For example, if the CNAME selection is based on regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdnprovder-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the SM components 140, 146, 152, 156.

Alternative or additional methodologies may also be practiced to determine whether the DNS nameserver is authoritative.

If at decision block 604 the receiving DNS nameserver is not authoritative, at block 606, the DNS nameserver selects and transmits an alternative resource identifier. As described above, the DNS nameserver can utilize a data store to identify an appropriate CNAME as a function of the current DNS query. Additionally, the DNS nameserver component can also implement additional logical processing to select from a set of potential CNAMES. The routine 600 proceeds to block 610.

Alternatively, if the receiving DNS nameserver is authoritative (including a determination that the same DNS nameserver will be authoritative for subsequent DNS queries), the receiving DNS nameserver resolves the DNS query by identifying the IP address of network storage provider storage component 142, 148, 154 (FIG. 1) at block 608. In a non-limiting manner, a number of methodologies for selecting an appropriate network storage provider storage component 142, 148, 154 have been previously discussed and may be utilized by the network storage provider 110.

At block 610, the receiving DNS nameserver returns the DNS query result to the requesting client computing device 102. As previously described, the DNS query result can include an identification of an IP address of a network storage provider storage component 142, 148, 154 if the network storage component 110 is going to process the subsequent resource request or a CNAME if a CDN service provider 106 will process the subsequent resource request. At block 612, the routine 600 terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content requests comprising:
one or more storage components operative to store resources on behalf of a content provider and provide one or more resources in response to client computing device requests, wherein the one or more storage components correspond to storage components distinct from content provider provided storage components; and
a storage management component operative to:
obtain a client computing device domain name system (DNS) query corresponding to a requested resource;
determine whether a subsequent request for the requested resource corresponding to the DNS query should be received by a storage component associated with a network storage component or by one or more content delivery network (CDN) service providers based on a financial cost attributed to the content provider for providing the requested resource by each of the network storage component and the one or more CDN service providers respectively;
selecting at least one alternative resource identifier associated with at least one of the storage component associated with the network storage component and the one or more CDN service providers based on a financial cost for providing the requested resource below a cost threshold; and
in response to the DNS query, cause the return of the at least one alternative resource identifier.

2. The system as recited in claim 1, wherein the client computing device DNS query is associated with an embedded resource.

3. The system as recited in claim 1, wherein the storage management component is further operative to cause the registration of a CDN service provider such that the CDN service provider will begin providing the requested resource.

4. The system as recited in claim 3, wherein the registration of the CDN service provider is completed automatically without requiring additional interaction from a content provider.

5. The system as recited in claim 1, wherein the alternative resource identifier corresponds to a CDN service provider associated with a lowest financial cost for providing the requested resource.

6. The system as recited in claim 1, wherein selecting at least one alternative resource identifier associated with at least one of the storage component associated with the network storage component and the one or more CDN service providers includes selecting at least one alternative resource identifier based on at least one of a characteristic of the content provider and a characteristic of the client computing device.

7. A method for managing resource requests comprising:
obtaining a domain name system (DNS) query from a client computing device, the DNS query corresponding to a resource maintained by a network storage provider on behalf of a content provider;

determining a financial cost corresponding to each of a storage component associated with the network storage provider and a content delivery network (CDN) service provider respectively providing the requested resource, wherein the financial cost corresponds to a cost attributed to the content provider for the provision of the requested resource; and transmitting one of an alternative resource identifier corresponding to a CDN service provider or an IP address of the storage component associated with the network storage provider as a function of the one or more determined financial costs satisfying a cost threshold.

8. The method as recited in claim 7, wherein transmitting one of an alternative resource identifier corresponding to a CDN service provider or an IP address of the storage component associated with the network storage provider is further based on at least one other request routing criterion.

9. The method as recited in claim 8, wherein the request routing criterion includes at least one of a total number of requests obtained from client computing devices for a resource over a defined period of time, trends regarding an increase in requests from client computing devices for the resource, and trends regarding a decrease in requests from client computing devices for the resource.

10. The method as recited in claim 8, wherein the at least one other request routing criterion includes cost information.

11. The method as recited in claim 7, wherein transmitting the alternative resource identifier associated with one of the one or more CDN service providers or the IP address associated with one of the one or more storage components associated with the network storage provider includes:

identifying one or more service providers associated with a quality of service for providing the requested resource; and selecting a service provider from the one or more service providers based on a quality of service threshold.

12. The method as recited in claim 7, wherein transmitting the alternative resource identifier associated with one of the one or more CDN service providers or the IP address associated with one of the one or more storage components associated with the network storage provider includes:

identifying one or more service providers associated with a content provider metric for providing the requested resource; and selecting a service provider from the one or more service providers based on a content provider metric threshold.

13. The method as recited in claim 7 further comprising causing the registration of a CDN service provider such that the CDN service provider will begin providing the requested resource.

14. The method as recited in claim 7, wherein the alternative resource identifier corresponds to a canonical name (CNAME).

15. A method comprising:

obtaining a domain name system (DNS) query from a client computing device, the DNS query corresponding to a request for a resource maintained by a network storage provider on behalf of a content provider;

associating a financial cost with each of one or more content delivery network (CDN) service providers, wherein the financial cost corresponds to a cost attributed to the content provider for providing the resource by each of the one or more CDN service providers respectively;

selecting an alternative resource identifier associated with one of the one or more CDN service providers based on a financial cost for providing the resource below a cost threshold; and providing the alternative resource identifier responsive to the DNS query, wherein the alternative resource identifier is provided as an alternative to identifying an IP address of a storage component of the network storage provider obtaining the DNS query.

16. The method as recited in claim 15, wherein providing the alternative resource identifier corresponding to a CDN service provider is further based on at least one other request routing criterion.

17. The method as recited in claim 16, wherein the at least one other request routing criterion includes a volume of request information.

18. The method as recited in claim 17, wherein the volume of request information includes at least one of a total number of requests obtained from client computing devices for a resource over a defined period of time, trends regarding an increase in requests from client computing devices for the resource, and trends regarding a decrease in requests from client computing devices for the resource.

19. The method as recited in claim 15, wherein the alternative resource identifier is provided as an alternative to identifying an IP address of a storage component of a network storage service provider when a CDN service provider is associated with a quality of service metric meeting a content provider metric threshold for providing the requested resource.

20. The method as recited in claim 15 further comprising causing the registration of a CDN service provider such that the CDN service provider will begin providing the requested resource.

21. The method as recited in claim 15, wherein the alternative resource identifier corresponds to a canonical name (CNAME).

22. The method as recited in claim 16, wherein the at least one other request routing criterion comprises at least one of financial cost information, quality of service information, and volume of request information.

23. A method comprising:

obtaining a domain name system (DNS) query from a client computing device, the DNS query corresponding to a request for a resource maintained by a network storage provider on behalf of a content provider; and providing one of an alternative resource identifier corresponding to a content delivery network (CDN) service provider or an IP address of a storage component associated with the network storage provider as a function of request routing criteria associated with the resource maintained by the network storage provider on behalf of the content provider;

wherein providing one of an alternative resource identifier corresponding to a CDN service provider or an IP address of a storage component associated with the network storage provider includes:

identifying one or more service providers associated with a financial cost for providing the requested resource below a cost threshold; and selecting a service provider from the one or more service providers that satisfies the cost threshold.

* * * * *

UNITED STATES PATENT AND TRADEMARK OFFICE
CERTIFICATE OF CORRECTION

PATENT NO. : 8,239,514 B2  Page 1 of 1
APPLICATION NO. : 13/299169
DATED : August 7, 2012
INVENTOR(S) : Richardson et al.

It is certified that error appears in the above-identified patent and that said Letters Patent is hereby corrected as shown below:

At Col. 7, Lines 9-10, please delete
"http://additionalinformation.storageprovidencom/www.contentprovidencom/path/resource.xxx"
and insert
--http://additionalinformation.storageprovider.com/www.contentprovider.com/path/resource.xxx--.

At Col. 7, Lines 59, please delete "corn" and insert --com--.

At Col. 7, Line 61, please delete "corn" and insert --com--.

At Col. 8, Line 47, please delete "thereof An" and insert --thereof. An--.

Signed and Sealed this
Fifth Day of February, 2013

Teresa Stanek Rea
*Acting Director of the United States Patent and Trademark Office*